(12) United States Patent
Topness et al.

(10) Patent No.: US 10,360,197 B2
(45) Date of Patent: Jul. 23, 2019

(54) ELECTRONIC DOCUMENT SYSTEM

(71) Applicant: Accenture Global Services Limited, Dublin (IE)

(72) Inventors: Phillip Topness, Ashburn, VA (US); Breck Ruppelius, Montgomery, TX (US); Huage John Zheng, Walnut, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 424 days.

(21) Appl. No.: 14/918,383

(22) Filed: Oct. 20, 2015

(65) Prior Publication Data

US 2016/0117303 A1   Apr. 28, 2016

Related U.S. Application Data

(60) Provisional application No. 62/067,244, filed on Oct. 22, 2014.

(51) Int. Cl.
*G06F 17/24*  (2006.01)
*G06F 16/22*  (2019.01)
*H04L 29/08*  (2006.01)
*G06Q 10/10*  (2012.01)

(52) U.S. Cl.
CPC ............ *G06F 16/22* (2019.01); *G06Q 10/10* (2013.01); *H04L 67/1085* (2013.01)

(58) Field of Classification Search
CPC ........... G06F 17/20; G06F 8/35; G06Q 10/06; G06Q 10/06316; G06Q 10/0633; G06Q 10/103
See application file for complete search history.

(56) References Cited

U.S. PATENT DOCUMENTS

| | | | | |
|---|---|---|---|---|
| 7,000,179 B2 * | 2/2006 | Yankovich | ............. | G06Q 10/10 715/222 |
| 8,650,052 B1 * | 2/2014 | Anagnoson | ............ | G06Q 40/00 705/36 R |
| 9,742,614 B2 * | 8/2017 | Chikirivao | ............. | G06Q 10/06 |
| 2002/0107752 A1 * | 8/2002 | Rivera | .................... | G06Q 30/06 705/26.81 |
| 2003/0233374 A1 * | 12/2003 | Spinola | .................. | G06Q 10/02 |

(Continued)

*Primary Examiner* — Wilson W Tsui
(74) *Attorney, Agent, or Firm* — Mannava & Kang, P.C.

(57) ABSTRACT

An electronic document system, for example, includes a network portal that connects to end user devices via a network and generates graphical user interfaces on the end user devices. A database server stores data extracted by data capture entities (DCEs) associated with submitted electronic documents and approval routes for each DCE. An approval route includes steps identifying users and approval actions to be performed by the users. An application server determines an approval route from the stored approval routes for each submitted electronic document, and generates notifications for the users on the approval routes to execute the approval actions, and generates a visual representation of the approval routes in status pages via the network portal. Visual representations in the status pages are updated in real-time to indicate status information for the submitted electronic documents as the submitted electronic documents traverse respective approval routes.

20 Claims, 15 Drawing Sheets

(56) References Cited

U.S. PATENT DOCUMENTS

| | | | |
|---|---|---|---|
| 2005/0027651 A1* | 2/2005 | DeVault | G06Q 10/10 705/38 |
| 2005/0278164 A1* | 12/2005 | Hudson | G06F 17/2785 704/4 |
| 2006/0080616 A1* | 4/2006 | Vogel | G06F 9/4443 715/769 |
| 2006/0129443 A1* | 6/2006 | Chen | G06F 8/34 715/771 |
| 2007/0168382 A1* | 7/2007 | Tillberg | G06F 17/30253 |
| 2007/0192118 A1* | 8/2007 | Bukovec | G06Q 10/06 345/441 |
| 2008/0133682 A1* | 6/2008 | Chadwick | H04L 51/12 709/206 |
| 2008/0221952 A1* | 9/2008 | Mohri | G06Q 10/06 705/7.11 |
| 2009/0063240 A1 | 3/2009 | Pallari et al. | |
| 2009/0070365 A1 | 3/2009 | Pallari et al. | |
| 2010/0299272 A1* | 11/2010 | Lyons | G06Q 10/10 705/301 |
| 2011/0191217 A1* | 8/2011 | Saiu | G06Q 10/103 705/32 |
| 2012/0060162 A1 | 3/2012 | Hunt et al. | |
| 2014/0019159 A1* | 1/2014 | Singh | G06Q 10/103 705/3 |

* cited by examiner

Submit Form

Name:        (read only, pulled from credentials)

Email:       (read only, pulled from credentials if avail)

Attachment:  [ Upload ]

Comments:    (500 chars, opt)

FIG. 4A

Submit Form

Name:        100 char, required

Email:       255 char, required, email format validation

Attachment:  [ Upload ]

Comments:    (500 chars, opt)

FIG. 4B

Form Definition

Status: Active | Inactive
Name: (100 chars, req'd)
Number: (100 chars, opt)
Description: (2,000 chars, opt)

Approval Route: Lookup
Download Link: URL, opt.
Contact POC: Email, required
Owner: Team (relationship)

Show Approval Detail: ☑

Data Capture Entities
Text
Text
Text

FIG. 4C

Data Capture Entity

Format: PDF | PureEdge | XML
Document: Upload    Download
Version: (extracted from document)
UniqueID: (extracted from document)
Status: Active | Obsolete Select Fields To Extract From This Document
☑ Extracted Field 1
☑ Extracted Field 2
☑ Extracted Field 3

FIG. 4D

Submit a Form For Approval Processing

| File | Edit | View | Window | Help | | | | | |
|------|------|------|--------|------|---|---|---|---|---|
| My Files | | 1 / 1 | | 73.6% | | Tools | Sign | Comment | Extended |

Please fill out the following form. You can save data typed into this form.     Highlight Existing Fields

REQUEST FOR ISSUANCE OF STATUS OF FORCES AGREEMENT (SOFA) IDENTIFICATION

Section I – Identification of Sponsor

| Name (last, first, middle initial) | Grade | SSN | | |
|---|---|---|---|---|
| Topness, Phillip | | | | |
| Organization (Including unit and APO) | Check applicable block and enter date | | | |
| | ☐ Sponsor's date of completion of tour (Civilian) | | Date: | |
| | ☐ Sponsor's date of expiration of contract (Contractor) | | Date: | |

Section II – Persons for Whom SOFA Identification is Required
(Include sponsor from section I when applicable.)

| Name (last, first, MI) | Relationship | Passport number |
|---|---|---|
| Emily | | |
| Rebecca | | |
| Kate | | |

Section III – Verification of Eligibility by Personnel Officer of Other Responsible Official

AE Forms 600-77A are valid for only 90 days after the verifying official signs in section III. Applications held longer are void.

| Organization and APO number of verifying officer/official | | Telephone number |
|---|---|---|
| Typed name, grade, and title of verifying officer/official | Date (YYYY/MM/DD) | Signature |

FIG. 5

Accenture Federal Services          Home    Contact

Submit A Form To ApprovePath

Enter the required information below, then click Browse to upload your completed form.

Name *

[Phil Topness]

Email Address *

[Philip.topness@xxx.com]

Comments

[Please expedite!]

Upload file *

[C:\ApprovePath\Resources\Form Examples from Topness\AEF600-77A —] [Browse....]

[Submit]

FIG. 6

Accenture Federal Services          Home  Contact

Status

Applicant Name: Phil Topness
Form Name: SOFA Form – AE Form 600-77A, February 11 (Vers. 01.00)
Submitted On: 21 Sep 2014
Approval Status: In Approval Route
Comments from Applicant: Please expedite!
Comments from Approver:

Approval Route
Stage 1 — IA Manager : Approve / Disapprove
Stage 2 — John Zheng : Approve / Disapprove
        Information Assurance Team : Information Only
Stage 3 — Jhen Perillo : Approve / Disapprove / Send Back to Previous Stage
        Security Manager : Approve / Disapprove

Process a form approval

| File | Approval Route Steps | View | Chart | Customize | | | |
|---|---|---|---|---|---|---|---|
| Edit Delete Records | Assign | Share Copy a Link E-mail a Link Collaborate | | Import Data | Export to Excel Filter Data | Advanced Find | |

ApprovePath    Approval Route Steps    My Active Approval Requests

| | Name | Name (Data Capture Entity ID) | Applicant Name | Created On | Format |
|---|---|---|---|---|---|
| | ☐ Approve/Disapprove | Form Definition 101-AE Form | Keawe Ng | 9/3/2014 5:51 PM | PDF |
| | ☐ Approve/Disapprove | Form Definition 101-AE Form | Keawe Ng | 9/3/2014 6:07 PM | |
| | ☐ Information Only | AEF1-10A | Keawe Ng | 9/3/2014 5:51 PM | |
| | ☐ Information Only | Form Definition 101-AE Form | Keawe Ng | 9/3/2014 6:07 PM | |

My Work
Data Submission
Approval Requests
Templates
Approval Route Templates
ApprovePath
Form Definitions

FIG. 9

Related

Common
Audit History

Processes
Workflows
Dialog Sessions

Routing Matrix

| Owner | Role | Status | Action Date | Comments |
|---|---|---|---|---|
| Stage 1 | | | | |
| RADS Admin | Information Only | Completed | 9/21/2014 11:15 AM | |
| Stage 2 | | Active | | |
| ApprovePathDemo | Approve / Disapprove | Active | | |
| Stage 3 | | Pending | | |
| RADS Admin | Approve / Disapprove / Send Back to Previous Stage | Pending | | |

Form Summary

| | Page Field Name | Field Value |
|---|---|---|
| 1 | ControlNumber_FIELD | 134567879 |
| 1 | Discussion_FIELD | |
| 1 | Email_FIELD | Phillip.topness@xxx.com |
| 1 | For_Approval_CHEKBOX | 0 |

Register a new form

File | Form Definition | Customize
Save | Save & Close | Delete | Assign | Share / Copy a Link / E-mail a Collaborate Link | Run Workflow | Start Dialog | Run Report | | RADS Admin
Save | | | | | Process | Data | | ApprovePathDemo

Information
- General
- Data Capture Entity

Form Definition
SOFA Form

General
- Name: SOFA Form
- Number: AEF600
- Description:

Approval Route Template: Information Assurance Approvals
Download Link *: Http://downlad.com
Contact POC *: John Zheng
Owner *: IA Manager
Show Approval Detail: ☑

Data Capture Entities

| ☐ | Name | Format | Version | Created On | Expiration Date |
|---|------|--------|---------|------------|-----------------|
| ☐ | SOFA Form – AE 660-77A February 11 (Vers. 01.00) | PDF | | 9/16/2014 1:54 PM | |

Status: Active

Related

Common
- Audit History

Processes
- Workflows
- Dialog Sessions

Form Definitions
IA Manager

ELECTRONIC DOCUMENT SYSTEM

PRIORITY

The present application claims priority to U.S. provisional patent application Ser. No. 62/067,244, filed Oct. 22, 2014, which is incorporated by reference in its entirety.

BACKGROUND

Electronic document storage and management sometimes includes storing and managing hundreds of thousands of documents. Managing the storage and retrieval of the large volume of electronic documents is critical to allow quick access to the electronic documents as needed. Furthermore, managing tasks or actions performed on the electronic documents is critical. For example, in many different scenarios users are often required to download and submit completed electronic documents. The completed electronic documents are often sent by email to one or more users for review, approval, further processing, etc., and the users that sent the documents are often not notified of the status of the documents. Furthermore, once the documents are submitted via email, it may be processed and sent to other users via email for further review, approval and processing and so on. Often, no indication or mechanism is provided to make sure the document is submitted correctly, no feedback is provided to the submitter, protection of personal information (PII) may be minimal, and actions performed on the document may be inconsistent.

BRIEF DESCRIPTION OF THE DRAWINGS

Features of the present disclosure are illustrated by way of example and not limited in the following figure(s), in which like numerals indicate like elements, in which:

FIGS. 4A-D show information that may be provided through a portal for the system, according to examples of the present disclosure; and FIGS. 5-13 show screen shots that may be generated by the system 100, according to examples of the present disclosure.

DETAILED DESCRIPTION

Figure 1:
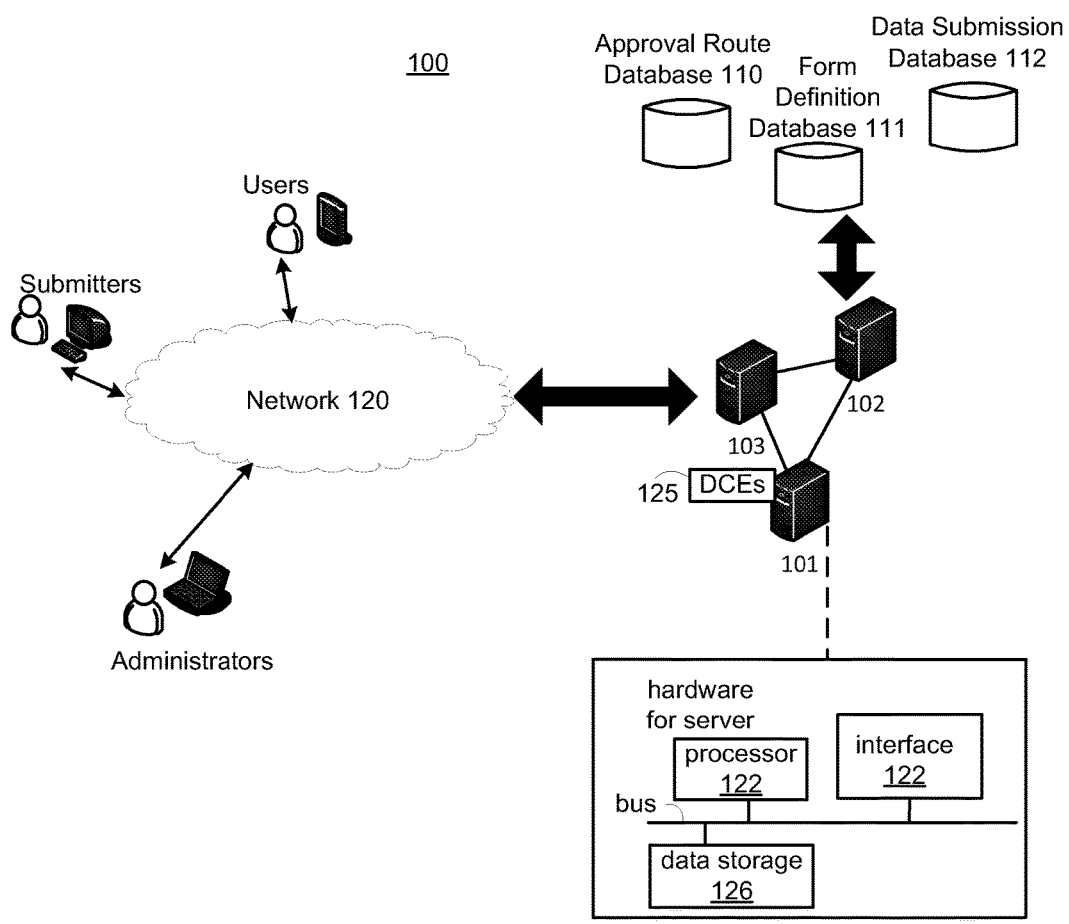
FIG. 1 shows a system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

According to examples of the present disclosure, an electronic document storage and management system stores, manages and maintains security of electronic documents. The system also facilitates an electronic approval process. Document submitters may submit electronic documents to the system via document capture entities. The system generates and updates real-time status information for submitted documents and provides the information for display to submitters, for example, via a portal. The submitters can return to the status information at any time to check the status of the submitted documents. The system is also referred to as ApprovePath.

The system can extract data from the submitted electronic documents and populate approver pages with the relevant information. Each approver page may be for a specific user that is designated to approve the electronic document at different steps of an approval route, which is further described below. Also, the information in each approver page that is extracted from the electronic document may include information that is to be reviewed by the specific user for approval and may not include all the information from the electronic document. To facilitate ease of use and to expedite approval, an approver page may be a single page and include a button for approve or deny.

The system determines the approval route for the electronic document. The approval route includes ordered steps that specify actions and users for each action. The approval route may specify a list of users to approve the document and an order for the users to approve the document. For example, each step may specify a user that is an approver and may specify an action, such as whether the user approves or denies the electronic document. The electronic document may be edited as it traverses the approval route if needed, such as making edits to allow approval. Different types of electronic documents may have different approval routes.

The approval route may have multiple paths. The paths may be parallel or serial paths. The approval route can be modified during approval as needed by authorized users. A visual representation of the approval route is generated by the system and may be shown via the portal to the submitter in the status information to indicate the current status of the electronic document in the approval process. For example, the visual representation provides the up-to-date status that can be viewed by the submitter and allows the user to quickly identify where the document currently falls in the approval route and the approval state (i.e., whether the form was approved) for each step. After the approval route is completed, a notification, such as an email, text message, etc., is sent back to the submitter so they can view the status. The system allows users to add or modify form definitions, approval routes, etc.

Also, document security is maintained. For example, electronic document submissions are made "private" with visibility granted only to those in the approval route. Also, the electronic document does not need to be emailed, so the electronic document is less susceptible to security vulnerabilities caused by email. Also, there may be other risks or issues associated with sending emails having attached documents. For example, the documents attached to emails are often stored in a distributed and duplicative way, such as stored on the server and stored locally on a user's personal computer, and there may be no version control on the different copies made via email.

The technical advantages of the system include heightened electronic document security as described above. Also, the system facilitates real-time status updates of electronic document approval via the submitter portal, and also facilitates faster approval of electronic documents via the approver pages generated by the system. Furthermore, the system improves the processing time of documents for example by parsing submitted forms (e.g., PDF or other formats) and extracting data from the forms that is needed for the approval process. Also, by extracting the data from the forms, the information needed for making an approval decision at each step of the route may be displayed without retrieving and displaying the entire form. The extracted data is routed through a flexible approval workflow process, and particular fields of the extracted data are presented in a single form with other facts to streamline and speed the process of approving the form. Furthermore, an improved visual presentation of the data is generated that allows for faster approval of the documents. Additionally, documents may be centrally stored and version control can be applied to the stored documents.

Examples of user role definitions used herein are as follows. A submitter is a person that submits an electronic document to the system. A user is a person that creates and maintains form definitions and may include a person that approves an electronic document. An administrator can perform all user functions and also create and edit users. Administrators can edit templates, form definitions and form submissions. These entities may interact with the system via a portal or other interface.

Some terminology used herein is now described. A form definition for example is a schema that describes the fields for an electronic document. The form definition may describe the fields and data types and field constraints for a type of electronic document. An electronic document may be submitted in one or more formats, such as PDF, PUREDGE, SHAREPOINT, XML, etc., and may be displayable. A data capture entity (DCE) may include machine readable instructions executable by a processor to extract data from a submitted electronic document and store the extracted data and other data, such as user input, for the electronic document and for approval of the electronic document. A DCE may include a parser that stores field information for a particular type of electronic document. The field information may include field types and location of the field within the electronic document. To extract data from a field, the parser goes to the location of the field in the electronic document and extracts the data from the field. A DCE may be created for each type of electronic document. For example, different types of forms may be submitted to the system 100 for approval. Each form has a corresponding DCE to extract data from the submitted form.

FIG. 1 illustrates an example of an electronic document storage and management system 100, also referred to as ApprovePath. The system 100 may include one or more servers. For example, the system 100 may include an application server 101 running an application providing the operations of the system 100, such as document management, status updates, approval route management, form definition creation, and other operations described herein. The application server 101 may include DCEs 125 that can extract data from submitted electronic documents. The system 100 may include a database server 102 connected to a data repository for storing and retrieving information for electronic documents. The data repository may include one or more databases. By way of example, the databases may include an approval route database 110 storing information for approval routes, a form definition database 111 storing form definitions, and a data submission database 112 storing information extracted from electronic documents, such as submitted forms, and data input by users. A web server 103 provides a portal for users, submitters, and administrators to access and interact with the system 100. FIG. 1 shows users, submitters, and administrators accessing the system 100 via a network 120. In one example, the users, submitters, and administrators access the system 100 through the user devices, such as personal desktop computers, laptops, tablet computers, mobile phones, work stations, etc.

Examples of hardware that may be included in each of the servers 101-103 is shown. The hardware may include at least one processor 124, an input/output interface 122, and a data storage 126. The processor 124 may include a microprocessor operable to execute machine readable instructions to perform programmed functions and/or hardware dedicated to perform one or more particular functions, such as an application specific integrated circuit (ASIC), field-programmable gate array (FPGA), or other customized integrated circuit.

The data storage 126 may include volatile and/or non-volatile data storage, such as random access memory, memristors, flash memory, and the like. Machine readable instructions and any information used by the system 100 may be stored in the data storage 126. The input/output interface 122 may include hardware and/or software to enable the processor 124 to communicate with hosts and other devices. The input/output interface 122 may include a network interface.

Figure 2A:
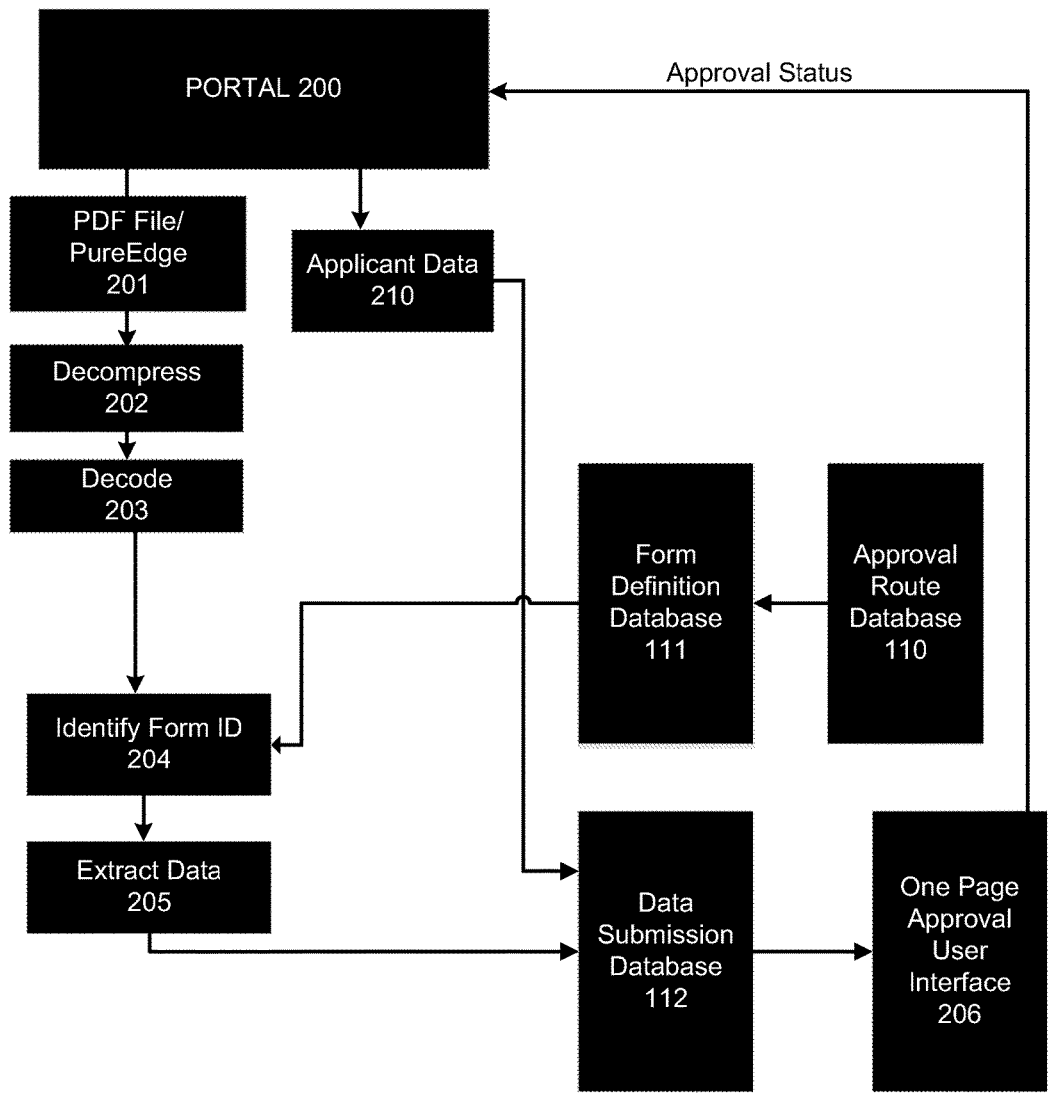
FIG. 2A-B show operations and a data flow of the system, according to examples of the present disclosure.

FIG. 2A shows a data flow diagram for the system 100. A portal 200 may be generated by the web server 103. The portal 200 for example is an Internet portal that generates web pages, including graphical user interfaces, which allow submitters, users, and administrators to interact with the system 100. Applicant data 210 may be input by the submitters, users, and administrators, such as username and email address and password, for authentication and to allow access to the system 100 via the portal 200. The applicant data 210 may be stored in the data submission database 112 if the applicant data 210 is being provided by a submitter submitting an electronic document. At 201, a submitter provides an electronic document for approval to the system 100. For example, an electronic document is uploaded into the system 100 via the portal 200. The electronic document may be of a format recognized by the system 100, such as PDF, PUREEDGE (i.e., a proprietary IBM format), XML, etc. At 202, the electronic document is decompressed, and at 203, is decoded. For example, PUREEDGE files are compressed and encoded XML files. The system 100 determines the type of file, and based on the type of file, determines whether decompression and decoded are needed to open the electronic document. If yes, the electronic document is decompressed and decoded. The system 100 may determine the type of electronic document from metadata with the electronic document, or may be specified by the submitter. Various transformations may be performed on the electronic document if needed.

At 204, the electronic document is opened to identify a form identifier (ID) or document ID of the document type. For example, various forms may be submitted to the system 100 for approval. Each form may include a unique ID. The unique ID is unique to the type of electronic document or is unique to the form. For example, the same form may be submitted multiple times to the system 100, and each time the form is submitted with different information populated in the form, such as information for different applicants or different submitters. The unique form ID may be the same for each submitted form, because the same form is submitted, even though it is populated with different information for each instance. Different forms have different unique form IDs. In addition to a unique form ID for each form, an identifier may be created and stored for each electronic document that is submitted, so the submission can be tracked throughout the approval process. The unique form ID may be used to retrieve a form definition corresponding to the unique form ID and identify a corresponding DCE from the form definition database 111. Also, an approval route for the electronic document may be retrieved from the approval route database 110 that corresponds to the unique form ID. At 205, the corresponding DCE is used to extract data from particular fields of the electronic document as specified in the form definition. The extracted data is stored along with the applicant data 210 (e.g., in database 112). The approval process is started according to the retrieved approval route. At 206, extracted data that is needed for each step of the approval process is retrieved and presented to each approver on the approval route, for example, via a user interface 206 that may be accessed through the portal 200. The user interface 206 may only display the information needed by each approver to make a decision on whether to approve the process. The information to be displayed may be specified in the form definition and/or the approval path. An approval status may be accessed by the submitter via the portal 200, as is further described below. Examples of web pages and user interfaces generated via the portal 200 are further described below. Also, steps for electronic document submission and approval are further described below.

Figure 2B:
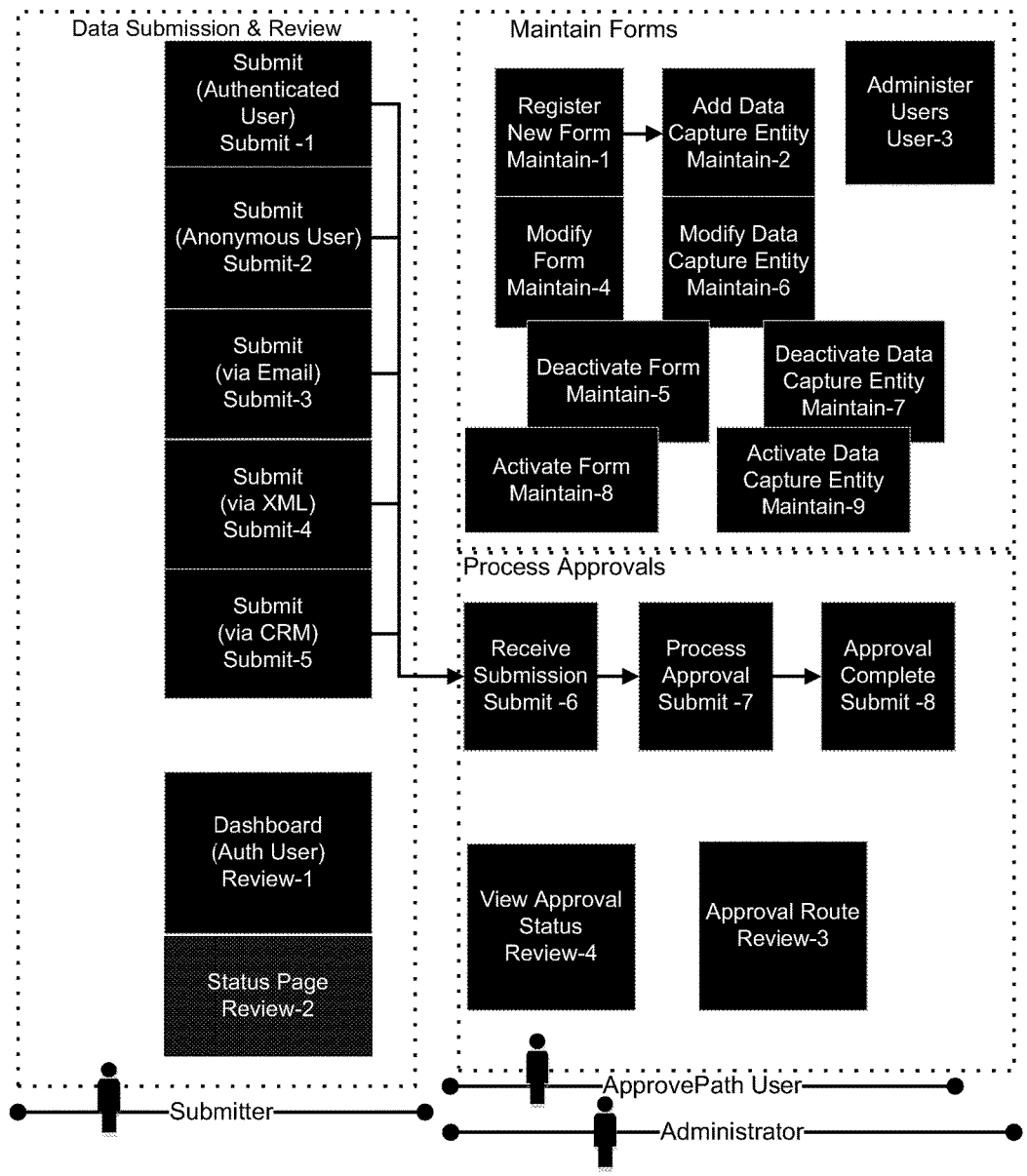

FIG. 2B shows examples of operations for electronic document storage and management that may be executed by the system 100 for submitters, users, and administrators and a dataflow for some of the operations.

Submit 1-5 represent different processes for submitting electronic documents to the system 100 to be approved according to an approval path. A user may store an electronic document locally in their end user device or in a shared drive on a network, and invoke the system 100 to extract data from the electronic document to submit it to the system 100. Submit 1 represents an authenticated user submitting an electronic document via the portal 200, which may be accessed through a browser on the user device. The system 100 for example provides web pages on the user device via a browser which include graphical user interfaces for document submission. Different web pages may be provided for different operations to be performed via the portal 200.

For submit 1, the submitter goes to the submission web page via the portal 200, for example, after successfully logging into the portal 200 and being authenticated by the system 100. FIG. 4A shows an example of information that may be provided on the submission web page. The submission web page loads with the submitter's name and email address (e.g., retrieved from submitter's network identity determined from authentication). These fields may be read-only. If an email address is not available for the submitter's network identity, the submitter may enter a valid email address. The submitter can add comments to augment their submission. The comments may be stored with the data extracted from the electronic document being submitted. The submitter may click an "Upload" button to invoke file browsing for locating the electronic document on their hard drive or other data storage, and uploads the electronic document for submission to the system 100. The system 100 may generate another web page confirming the electronic document submission and confirming that the system 100 has begun routing for approval. A submission status page, such as described with respect to Review-2, may be generated. The system 100 may send a message to the submitter with a link to the submission status page for this submission, and the submitter can review the submission status page at any time.

One or more of the following errors may occur when submitting an electronic document. For example, the submitter is submitting an electronic document comprising a form. If the submitter submits the form in an unrecognized format (e.g., non-PDF or another un-recognized format) an alert is generated to the user with a message to resubmit in an approved format. The form should coincide with a DCE so the data can be extracted. If not, an error is generated, such as "This form has not been configured for Approve-Path" and an administrator is alerted with the submitter's information (name, email) and an attached copy (or link to) the submitted electronic document. Also, if the system 100 includes a DCE that corresponds to the submitted electronic document but the DCE is inactive or expired, then a message may be generated: "The data you have submitted is out of date. Please download a newer copy of this form at this link: <link from Form record>".

Submit 2 shown in FIG. 2B is the same as submit 1, except the submitter has not been authenticated (e.g., anonymous) and a name and email are editable and are required. FIG. 4B shows an example of information in a web page for submit 2 with text boxes for entering the name and email address of the submitter.

Submit 3 shown in FIG. 2B is if the submitter emails the electronic document to the system 100. The submitter creates a new email message and addresses it to an email address for the system 100, such as an ApprovePath listener address. The submitter attaches the electronic document being submitted to the email. The system 100 receives the email and extracts the submitter's email address and name, e.g., from the email properties, if populated, or the email address. The system 100 begins the approval route associated with the electronic document submission. The submitter receives an email with a link to the submission status page. If the email has no attachment or multiple attachments, the system 100 may respond with an email asking the submitter to resend with one submission attached.

For submit 4 shown in FIG. 2B, an electronic document is submitted in XML to the system 100. The document may be uploaded by the user or submitted by an application. A properly formatted request, such as an XML request, is received at the portal 200 of the system 100. Response data, e.g., XML, containing a success message is returned to the submitter. This response contains a link to submission status web page. Submit 5 is performed via a Customer Relationship Management (CRM) application that may be running on the user's device. While in the CRM, the user may invoke the CRM to submit an electronic document from the CRM to the system 100, which may be performed through an application program interface.

Submit 6-8 represent operations performed at the system 100 after an electronic document is submitted for example via one of submit 1-5. At submit 6, a document identifier is extracted from the submitted electronic document, and a DCE associated with the document identifier is determined. For example, the form definition database 111 stores form definitions and information for DCEs that are created based on the form definitions. The form definition database 111 may store records including document identifier (which identifies the document type or the particular form that is being submitted) and corresponding DCE identifier identifying the DCE designed to extract data for that document type. The corresponding DCE is executed to extract additional data from the submitted electronic document. The approval route database 110 may store records including document identifiers and approval route identifiers. An approval route corresponding to the document identifier extracted from the submitted electronic document is retrieved from the approval route database 110. The system 100 initiates the approval route. At submit 7, a user is notified of an approval by the system 100 and processes it. The user is an approver that is responsible for approving or denying the submitted electronic document. The user receives an email notifying him/her of an active approval. Email contains a link directly to the approval page. The user clicks on the link to open an approval web page. The user is presented with a view of all approvals that are active for them or their associated team and a status, such as waiting approval. The user opens a record to open an approval web page for the record. The user is presented with an approval form that lists the submitter's name and email address, the submitter's comments, a summary of the approval route and extracts data from the submitted electronic document. The data to extract from the submitted electronic document is identified by the corresponding DCE. The DCE is configured to extract that data when it is created as discussed below with respect to Maintain-2 and Maintain-6. If the submission is a binary file, the user can download a copy of the file. The user can also upload a copy of the file. User clicks an approval option at the top of the form. The approval path continues.

For binary file submissions (e.g., PDF) the user can download, digitally sign, and upload the digitally signed electronic document. For example, the user can click, open, sign and close (opting to save when closing the file) and the signed file is updated in the data repository.

At submit 8, the approval is completed, and the submitter is notified. A pre-condition is that a route-ending approval step in the approval route for the electronic document is processed, as described in submit 7. For submit 8, a message, such as an email, is sent to the submitter with information about the approved electronic document, such as, Your ApprovePath submission of <Form Name> on <Submission Date/Time> was completed with a status of "<Approval Status>". Your notes for this submission: <Comments from submission form>. Click here <link to submission Status Page, story Review-2> for more detail. Also, the record for the submission may be marked as inactive in the CRM if submitted through the CRM.

Review 1-4 are now described. For review 1, an authenticated submitter can review the status of all of their submissions through the portal 200 via a dashboard, which is a graphical user interface. An authenticated submitter visits the dashboard. The dashboard lists a summary status of the submitter's electronic document submissions with the following fields for each submission: a. Date & Time Submitted (links to Status Page, story Review-2); b. Form Name; c. Form Number; and d. Current Approval Status (In Approval Route|Approval Canceled|Approval Complete|Disapproved).

At review 2, a submitter can view the status of a single submission. Following a submission, the submitter receives a message (see submit 6) with a link to the status page for that submission. The submitter can click the link to get a current status page for that submission. The status page may not require authentication. But the URL should be sufficiently unique, such as a globally unique identifier (GUID) or a universally unique identifier (UUID), to prevent submitters from guessing other valid status page URL's. The status page may display the following information: a. Submitter's name; b. Form Number; c. Form Name; and d. Submission Date/Time.

If "Show Approval Detail" has been selected (see discussion of maintain 1) then the status page shows the approval route detail: Stage, Approver, Approval Action, Date & Time. If "Show Approval Detail" has not been selected, the status page shows one of the following with a date and time stamp that the route completed: In Approval Route; Approval Canceled; Approval Complete; Disapproved.

At review 3, an approval route for an electronic document may be retrieved if stored, created, re-opened if previously closed, or modified. The electronic document should be active to open the approval route. A user may reopen an approval route or create a new approval route for a submitted electronic document. When an update to the approval route is made, the submitter's dashboard and status page reflect the new status.

At review 4, a review of submitted data and approval status for a data submission can be performed. Users and administrators can review active and closed electronic document submissions. Users can see only the data submissions that were routed to them for approval, or for electronic documents that their team owns. Administrators can view and edit all electronic document. By opening a data submission record for an electronic document, the user or administrator can see the approval status. After opening the record, users and administrators can see the submitter's details (name, email address) and the date and time the data submission occurred. Users and administrators can download the submitted data (PDF or PUREEDGE file, or XML data). Users and administrators can click a link to open the status page (see review 2) for this record.

Maintain 1-9 describes various operations performed by the system 100. Maintain 1 represents creating a new form definition. After logging into the system 100, the user navigates to the "Forms" web page in the portal 200. The user clicks the "New Form" button. Information for a web page including a form definition user interface, such as shown in FIG. 4C, is loaded. The form definition user interface may include the fields shown below in table 1:

TABLE 1

| Field | Type | Description |
|---|---|---|
| Status | Dropdown | Active, Inactive. If the Form Definition is Inactive then ApprovePath will not accept and process forms associated with the Form Definition. |
| Name | Text, 100 char, required | A name, unique among Form Definitions for this form definition records. |
| Number | Text, 100 char, optional (required) | A form number, unique among Form Definitions for this form definition record. |
| Description | Memo, 2000 char | A long description for this record. |
| Approval Route | Lookup | A lookup into Approval Route templates, used to assign an approval route template to this record. |

TABLE 1-continued

| Field | Type | Description |
|---|---|---|
| Download Link | Text, URL format validated, optional | This is a URL to serve as the official download link for this form. This URL is used in the "Submit" stories to direct the user to the proper form if an expired form is submitted. The form version may be captured. |
| Contact POC | Text, email format validated, required | Email address for a point of contact (POC) for this form. Could be one or more email addresses for an individual or a team. |
| Owner | Team | The team that owns this form. Only Administrators and members of this team can edit the Form and associated Data Capture Entity records. The owning Team will default to the team that created this Form. Administrators can change the owning Team, Users cannot. |
| Show Approval Detail | Checkbox | This checkbox determines if the submitter can see the full approval route detail or only a status reason. (Used in the "Review" story group). |
| Data Capture Entities | List of subordinate entities | Data Capture Entities is a list of subordinate Data Capture Entities. They are described with respect to Maintain-2, Maintain-6, Maintain-7. |

After populating the form definition user interface (except the "Data Capture Entities" list) the user clicks "Save" to create a new Form Definition. After the Form Definition is successfully saved, the option to add DCEs is displayed.

Maintain 2 is for creating a new form definition. With an active Form Definition open, the user clicks the "Add Data Capture Entity" button to create a new Data Capture Entity form. FIG. 4D shows an example of information in a web page (i.e., user interface) for creating the new form. The fields in FIG. 4D are described below in Table 2:

TABLE 2

| Field | Type | Description |
|---|---|---|
| Format | Dropdown | PDF, PUREEDGE, XML. This tells the system 100 how to interpret the uploaded document. May be displayed only as a label |
| Document | Upload Control | User uploads a new file. There can be overlapped period where both old and new version of form can be used. This can be controlled by Expiration Date and the status of the DCE. Expiration date will be entered by the user. |
| Version | Label | File version, extracted from the uploaded document. |
| Unique ID | Label | File unique identifier, extracted from the uploaded document. |
| Status | Dropdown | Active, Obsolete or Inactive. Sets whether this data capture record is the active. Data capture entities marked obsolete will not be processed by ApprovePath. Applicant cannot submit document of inactive DCE. |
| Expiration Date | Date Time | Allow user to set expiration date of the DCE. Applicant cannot submit document of expired DCE. |
| Status | Dropdown | Active, Obsolete or Inactive. Sets whether this data capture record is the active. Data capture entities marked obsolete will not be processed by ApprovePath. |
| Select Field To Extract From This Document | Checkbox List | A list of extracted data fields from the uploaded document. User will identify zero or more fields to extract from the documents. These extracted fields are displayed during the approval process (Story Submit-6). |

In FIG. 4D, the user identifies the document format (e.g., PDF, PUREEDGE, XML). The user uploads a document of that format using the Upload control. After successful upload (see potential error cases below) the version and unique ID embedded within the file are displayed. The user can then set the DCE status from the status dropdown. The default is Active. After the upload completes the "Select Fields To Extract From This Document" is populated with a list of form field identifiers extracted from the uploaded document. The user identifies (using the checkboxes) which fields will be extracted from this document. The user saves the DCE. The DCE is associated with the form definition it was created from. A DCE may belong to only one form definition.

For maintain 4 shown in FIG. 2B, an existing form definition is modified. After logging into the system 100, the user navigates to the "Forms" web page. The user can search and view document definition forms owned by teams that the user is member of. Administrators can see all forms. A user (or administrator) can double click a form record to see the user interface (UI) described in maintain 1. The user can edit the form data.

Maintain 5 is for deactivate an existing form definition. Deactivate a form definition means the system 100 stops accepting any version of electronic documents corresponding to this form and its DCE. Any DCE of the form definition is deactivated. The user can modify the form definition status to Inactive. This inactivates all associated DCEs.

Maintain 6 modifies a DCE associated with a form definition. With an active form definition being open, the user double clicks one of the DCEs to modify the DCE.

Maintain 7 deactivates a DCE. With an active form definition open, the user double clicks one of the DCEs to deactivate it.

Maintain 8 activates an existing form definition. For example, the user modifies the form definition status to Active. Maintain 9 activates a DCE associated with a form definition.

Some additional factors related to form administration, submission, and review are now described. For form administration, a user can create a new form, including the following information: Name; Number; Description; Status; Download URL; Approval Route; Contact POC (Point of Contact); Owner (team); metadata of each version (DCE); and whether to show approval detail.

For form submission, a submitter (can be external staff or internal staff) can submit a form that is active in the system. The following information can be submitted: Applicant Name, Applicant Email, the Document, and Comments. The submitter receives notification of the status of submitted document (submitted and completed). The notification includes a link to a list of submitted documents by the applicant. If the document is not supported, deactivated, or expired, the system 100 notifies the submitter that the document is not submitted and the reason. Once a document is submitted, the POC of the form receives a notification of the newly submitted document. The approval route defined for the DCE starts automatically if a submission of the DCE is successfully submitted. Users are able to change the approval route while the data submission is in progress. The approval user receives a message of a pending approval request that needs approval from him/her. The approval user accesses the portal 200 to view a list of approval requests that needs his/her attention. The approval requests include the submitted document, applicant name, applicant email, applicant comments, and extracted data from the document. The approval user approves or disapproves submitter's request and provides feedback. Once a request is completed (approved or disapproved), the submitter receives a notification. The user can reopen a completed document request.

Submitters may check the status of submitted document including the following information: submitter name, form name, form number, and submission time. If the user is internal and the form definition allows displaying approval details, more details (Stage, Approver, Approval Action, Date & Time) are displayed. The user and administrator can review open and closed submitted documents.

Figure 3A:
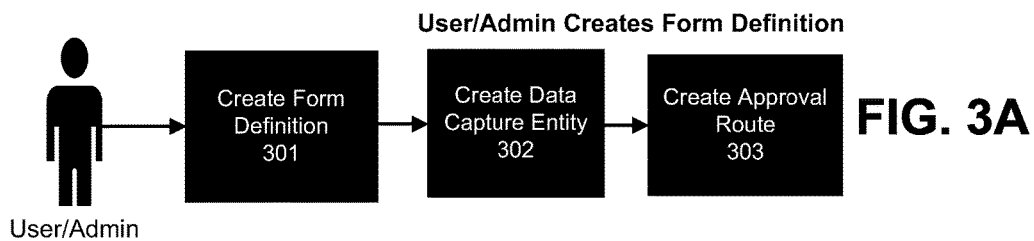
FIGS. 3A-D shows flow charts of processes that may be performed by the system, according to examples of the present disclosure.

FIGS. 3A-D illustrate examples of methods that may be performed by the system 100. FIG. 3A shows steps for creating and storing a form definition, a DCE and an approval route. At 301, a form definition is created by a user or administrator. In an example, a form with fillable fields may be uploaded to the system 100 for a form (or any type of electronic document). The fillable fields are extracted from the form and a schema is created for the form. The schema includes the fields and may include metadata for the fields, such as data type, field length, etc. A unique ID is assigned to the form or determined from the form, such as a form number on the form. The unique ID is used to associate the form with the form definition, approval route, and DCE for the form. In another example, instead of uploading a form with fillable fields, the user or administrator creates the form definition by entering schema information for the form. At 302, a DCE is created for the form and the form definition. The DCE may include code (e.g., machine readable instructions) that is invoked for example through a function call or other process to extract data from fields in the populated form when submitted by the submitter. In an example, fields to be extracted are determined from the form definition, and locations of the fields within the form may be determined. The DCE uses this information to extract the desired fields. The DCE may be created from a template or otherwise programmed by the administrator or another person. At 303, an approval route for the form is created. The approval route is entered by the administrator or the user, and identifies steps for the approval. Steps may be grouped into stages, and this allows for routing between stages and processing steps within a stage. For example, steps may be processed from stage-to-stage, and multiple steps are processed within each stage assuming the stage has multiple steps. Each step identifies the approver for that step, such as by name or by team, user ID, email, etc., and identifies the fields to be shown to the approver for the step. For example, only those fields are shown to the approver instead of all the fields or the entire form so it is easier and faster for the approver to make a decision on whether to approve or deny. The form definition that is created is stored in the form definition database, and the approval route that is created is stored in the approval route database 110, and the unique form ID is stored along with the form definition and the approval route. The DCE is also stored and associated with the unique form ID so it can be identified and invoked when a form with the unique form ID is submitted to extract data from the form.

Figure 3B:
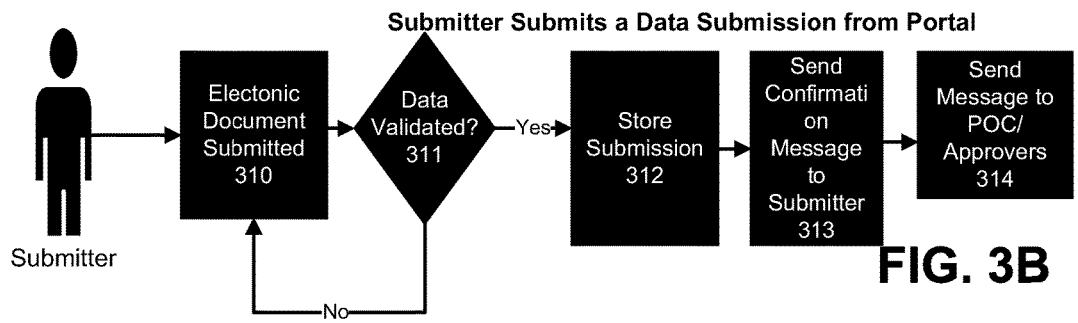

FIG. 3B shows steps for submitting an electronic document (e.g., a form) as a data submission, for example, via the portal 200. At 310, the submitter submits an electronic document to the system 100. For example, the submitter accesses the portal 200 and uploads an electronic document to the system 100 as a submission for approval. The submitted electronic document may be a completed form that needs approval. The data in the form is validated at 311. For example, the application server parses the submitted form to identify the unique ID of the form. Also, the application server 101 may check if all the required information is submitted, such as the submitter's information and/or other field information. After validation, a record is created for the data submission in the data submission database 112, and the DCE associated with the form is invoked to extract the field data from the form and store the field data in the data submission database at 312. At 313, the submitter receives a message from the system 100 confirming the submission, and, at 314, a message may be sent to the POC and/or approvers for the form to indicate that the form has been submitted to the system 100.

Figure 3C:
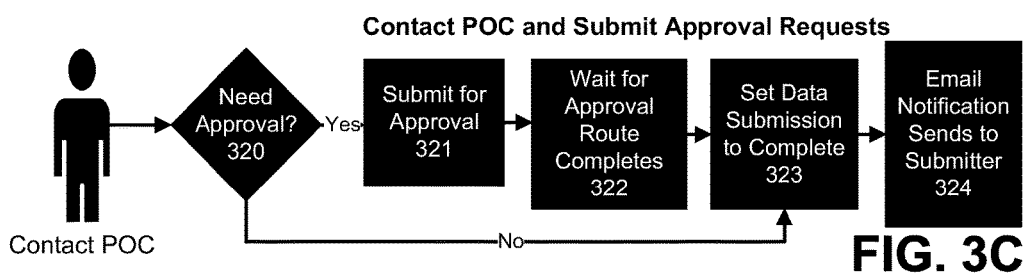

FIG. 3C shows steps for a POC for the form. The POC is a person that is the designated point of contact for the form. For example, the POC determines whether a submitted form needs approval at 320. If yes, the form is submitted for approval (321) and enters the approval route. The approval route is completed (322), such as when all the approvers have provided their decisions. At 323, the submitted form is marked as complete, and a message (e.g., email) is sent to the submitter to indicate that the form is approved. The submitted document may be sent on the approval route automatically when the document is submitted.

Figure 3D:
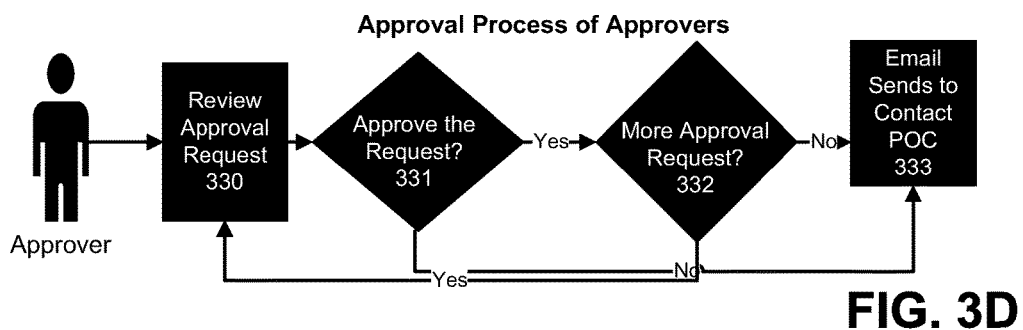

FIG. 3D shows steps for an approval process that may be performed by an approver on an approval route. The approver is notified by email or other messaging when an approval is waiting for the approver's decision. The approver can log into the portal 200 and view all their approval requests awaiting a decision. At 330, the approver selects and reviews an approval request. At 331, the approver decides to approve or deny the request. If the request is approved, at 332, more requests may be approved or denied if more are awaiting decision by that approver. If a request is denied, the POC may be notified at 333.

An approver, administrator, POC, or user may modify an approval route while the submitted document is in the middle of the approval route, such as at an intermediate stage before the document completes the final approval in the approval route. For example, an approver may determine that another person is needed in the approval process of the form or that there is no need for his/her approval on a particular form. The approver may modify the approval route to include an additional stage or remove a stage. Authorization may be needed to finalize the modification. The modifications are stored in the approval route database 110. Also, the approval route may be parallel or serial. A parallel approval route may have multiple paths with steps from two paths that can be simultaneously executed (i.e., make the approval decision). A serial path may be consecutive steps that are executed one after the other in the designated order. Also, an approval path may have branches. For example, if the submitted document is approved at a stage, the submitted document may enter one branch, but if denied, the submitted document may enter a different branch with different stages and different approvers.

Figure 9:
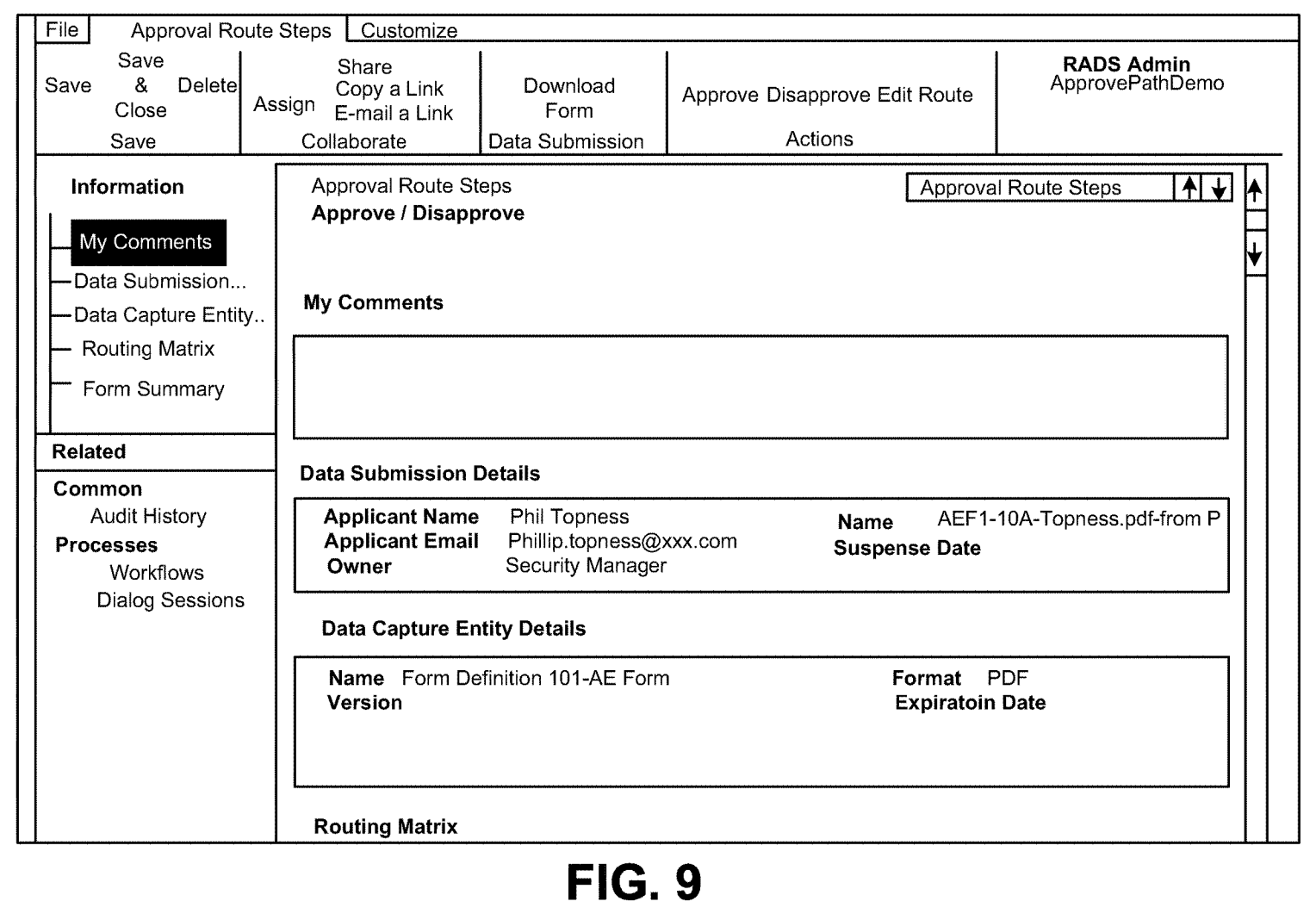

FIGS. 5-13 show examples of screen shots that may be generated by the system 100. The screen shots illustrate user interfaces that may be generated by the portal 200 for submitting an electronic document for approval processing; processing an electronic document for approval; and other processes. FIG. 5 shows a fillable form that may be completed by a user and uploaded to the system 100. FIG. 6 shows an interface for uploading the form. The user enters their name and email address and comments (if any). The path to the file is selected, and the form is submitted to the system 100. FIG. 7 shows an approval status page that may be viewed by the submitter. Form information is shown. Also, the approval route is shown and identifies the current stage of the submitted document in the approval route. FIG. 8 shows a list of pending approval requests for a submitter. FIG. 9 shows a user interface for an approver in a stage of the approval route. For example, the approver reviews data about the submitter, the approval route workflow and data extracted from the submitted document that was predetermined for that stage of the approval route. For example, only selected fields are displayed in the approval view that are needed for the approval decision. This puts information about the submitter, the approval route itself and the data submitted in one place. Approvers review this and click one button (Approve, Disapprover or other options) to complete the approval. FIG. 10 is a continuation of the user interface of FIG. 9.

Figure 12:
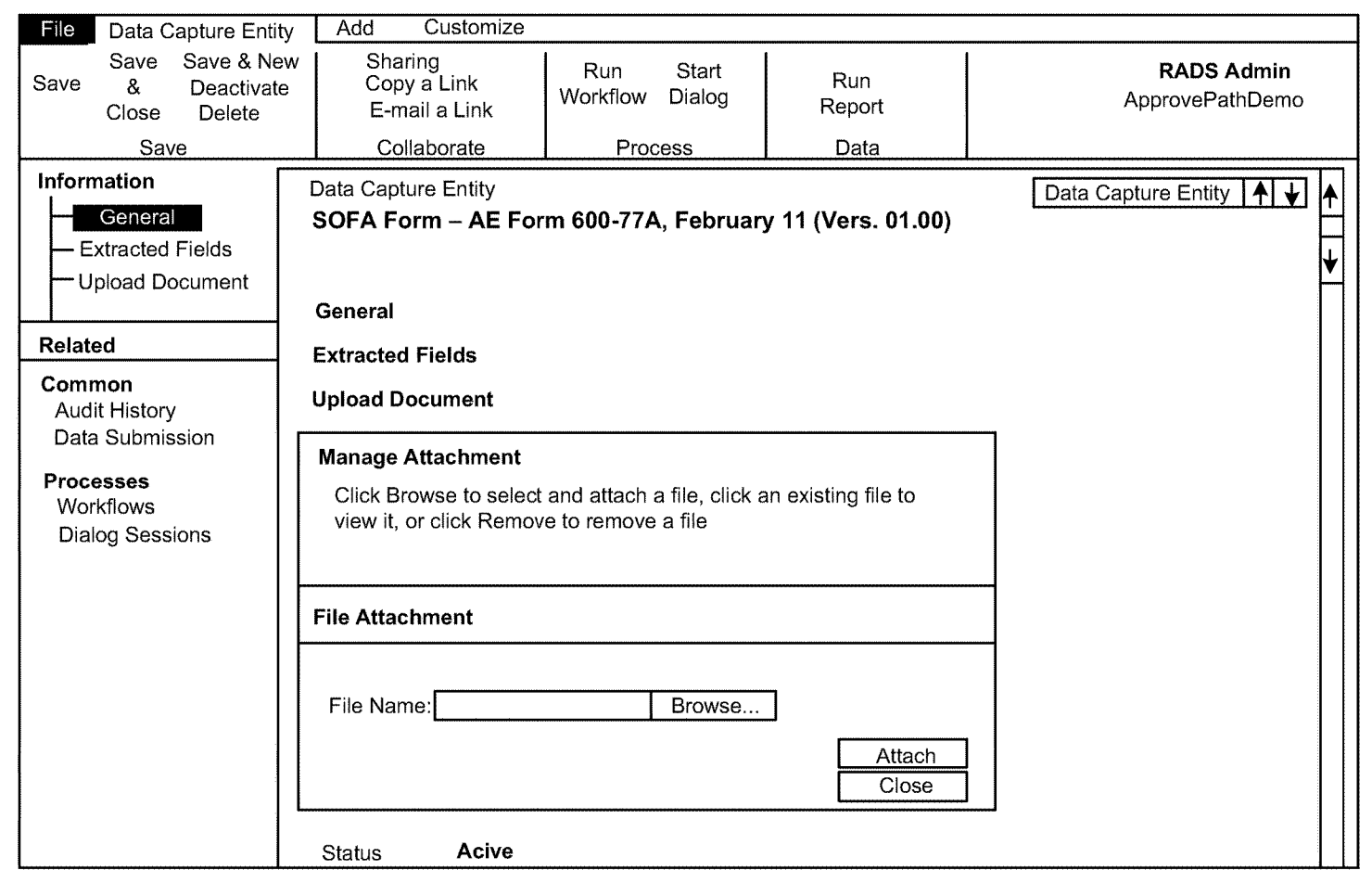
Figure 13:
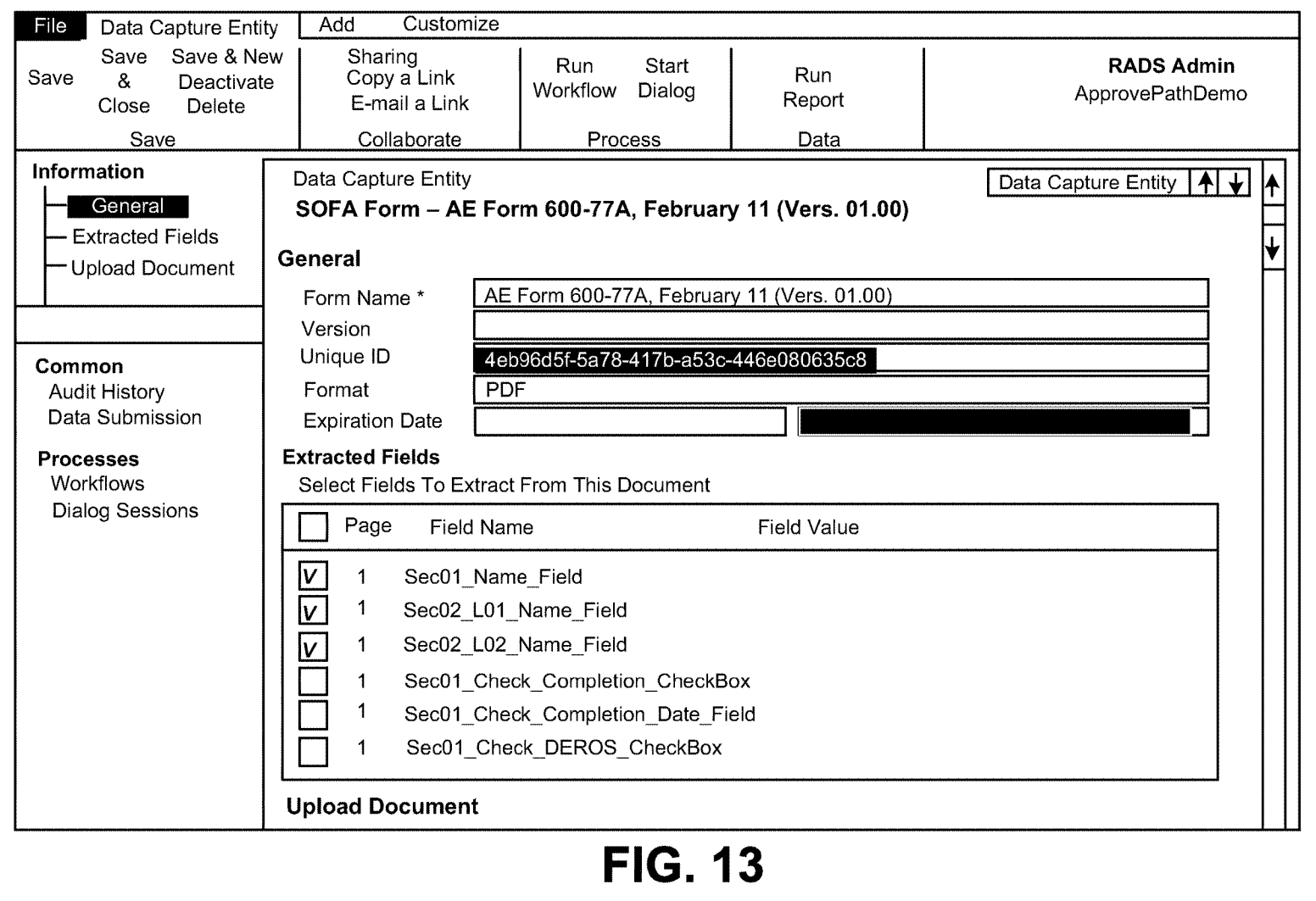

FIG. 11 shows a user interface for registering a new form. For example, a general description is provided that can correspond to multiple versions of the form (e.g., PDF, PUREEDGE, XML, etc.). An administrator creates a form definition and associates a form with it. The administrator identifies an approval route to associate to the form or creates one. When a user submits this form, it will be identified by the system and that approval route workflow will be started automatically. FIG. 12 shows a user interface for uploading the new form. FIG. 13 shows a user interface for selecting fields to extract from the new form when the form (i.e., a completed instance of the form) is submitted. The fields are extracted by a DCE created for the form.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. An electronic document system comprising:
    a network portal, including at least one processor, that connects to end user devices via a network and generates graphical user interfaces on the end user devices;
    a non-transitory database server that stores data extracted by data capture entities (DCEs) associated with submitted electronic documents and approval routes for each DCE, where:
        each DCE comprises instructions, which when invoked, perform a function call to extract data from fields in the electronic documents,
        the fields to be extracted of a particular type,
        the fields to be extracted determined from at least one form definition and locations of the extracted data,
        the determined locations of the extracted data are used to locate the fields from within the electronic documents, and
        at least one approval route is modifiable during approval,
            the at least one approval route including a plurality of paths that are parallel or serial paths and each path comprises steps,
            the steps identifying users and approval actions, and
            the approval actions to be performed by the users; and
    an application server, including at least one processor, that:
        creates a form definition for each of a plurality of types of electronic documents,
        receives and accepts one or more submitted electronic documents, wherein each submitted electronic document has a document type,
        processes and routes each submitted electronic document by:
            extracting data for each submitted electronic document by:
                identifying a unique document identifier of the submitted electronic document, and
                applying a DCE from the stored DCEs to the submitted electronic document,
                the applied DCE belonging to the identified unique document identifier and the identified unique document identifier being referenced from the created form definition having a same type as the submitted electronic document,
            determines an approval route from the stored approval routes for the submitted electronic document, where:
                each of the stored approval routes are assigned particular document identifiers, and
                the determined approval route specifies a list of users to approve the submitted document and order of approval traversal amongst the users,
            generates notifications for the list of users to obtain approval responses for the submitted document based on the order,
                where the determined approval route is modifiable within an order of approval traversal and the corresponding DCEs are modifiable based at least in part on the-determined approval route being modified, receives, via the network portal, an instruction to deactivate at least one of the form definitions, wherein deactivation, based on executing the instruction to deactivate, stops the acceptance of submitted electronic documents having the same time as the type of the deactivated form definition, generates a visual representation of the approval routes of the submitted electronic documents in status pages via the network portal, and where, the visual representations in the status pages are updated in real-time to indicate status information for the submitted electronic documents, the updating occurring as the submitted electronic documents traverse their respective stored or modified approval routes.

2. The electronic document system of claim 1, where the electronic documents are uploaded to the system via the portal, and, for each electronic document, the application server identifies a corresponding DCE and approval route to be retrieved by the database server based on a unique document identifier extracted from the electronic document.

3. The electronic document system of claim 1, where the form definition includes fields for each type of electronic document.

4. The electronic document system of claim 3, where, for each form definition, the application server identifies fields from the form definition for each step of a plurality of steps in an approval route associated with the form definition.

5. The electronic document system of claim 4, where the application server generates approver pages via the portal to allow the users to execute the approval actions, where the approval actions include approving or denying the electronic documents.

6. The electronic document system of claim 5, where data received via each approver page is used to populate the status pages.

7. The electronic document system of claim 5, where each approver page includes a button to approve or deny an electronic document.

8. The electronic document system of claim 5, where each approver page is for a step of the plurality of steps, and each approver page shows the selected fields from one of the form definitions that is for one of the submitted electronic documents being reviewed at the approver page.

9. The electronic document system of claim 1, where the approval routes are modifiable as the electronic documents traverse respective approval routes.

10. The electronic document system of claim 3, where the application server receives, via the portal, an instruction to deactivate at least one of the form definitions, deactivates the at least one form definition, and denies submissions of any electronic documents associated with the deactivated form definition.

11. The electronic document system of claim 10, where the application server deactivates any of the DCEs associated with the at least one deactivated form definition.

12. The electronic document system of claim 3, where the application server receives, via the portal, an instruction to modify at least one of the form definitions, and modifies the at least one form definition according to the instruction.

13. The electronic document system of claim 12, where the application server modifies any of the DCEs associated with the at least one modified form definition in accordance with modifications to the at least one modified form definition.

14. An electronic document system comprising:

a web server, including at least one processor, that generates graphical user interfaces in a network portal accessible by devices via a network;

a form definition database storing form definitions for a plurality of types of electronic documents, where each form definition comprises a schema including fields of one type of the plurality of types of electronic documents and data types for each field and a unique document identifier identifying the type of electronic document;

an approval route database storing, for each of the types of electronic documents, an approval route and the unique document identifier for the type of electronic document, where each approval route includes a plurality of steps and each step includes an identifier of an approver;

data submission database storing data extracted from electronic documents by data capture entities (DCEs) submitted via the portal, where:

each DCE comprises instructions, which when invoked, perform a function call to extract data from fields in the electronic documents, the fields to be extracted of a particular type, the fields to be extracted are determined from at least one form definition and locations of the extracted data, the determined locations of the extracted data are used to locate the fields from within the electronic documents, and approval routes are associated with each DCE, such that at least one approval route is modifiable during approval, where each DCE is modifiable based at least in part on an identified approval route being modified, the at least one approval route including a plurality of paths that are parallel or serial paths and each path comprises steps, the steps identifying users and approval actions, and the approval actions to be performed by the users; and an application server, including at least one processor, to:

create a form definition for each of a plurality of types of electronic documents;

receive a submission of an electronic document via the portal, where each submission is associated with a submitted electronic document having a document type;

store the DCE for each type of electronic document;

process and route each submitted electronic document by:

extracting data for each submitted electronic document by:

identifying a unique document identifier from the submitted electronic document, and applying a DCE from the stored DCEs to the submitted electronic document, the applied DCE belonging to the identified unique document identifier and the identified unique document identifier being referenced from the created form definition having a same type as the submitted electronic document;

extracting data in fields from the submitted electronic document according to the fields in the identified form definition;
storing the extracted data in the data submission database and associated the stored data with the submitted electronic document;
identify a form definition from the form definition database based on the unique document identifier from the submitted electronic document;
identify an approval route from the approval route database based on the unique document identifier from the submitted electronic document, where:
each of the stored approval routes are assigned particular document identifiers, and
the identified approval route specifies a list of users to approve the submitted document and the order of approval traversal amongst the users; and
at each step of the identified approval route, display to the approver of the step, via an approver web page generated via the portal, the extracted data for a predetermined set of the fields that are associated with the step to facilitate the approver to approve or deny the submitted electronic document at the step, and the at least one approval route modified during approval and by any modified DCEs.

15. The electronic document system of claim 14, where the application server determines an identifier of a submitter submitting the electronic document via the portal, and generates and sends a message to a device used by the person to confirm that the electronic document is received and started an approval process.

16. The electronic document system of claim 15, where in response to the submitter successfully logging into the portal and navigating to a status page, the web server generates a status page indicating an approval status of electronic documents submitted to the electronic document system by the submitter, and a visual representation of the approval route for each of the submitted electronic documents, and an indication of current location of each submitted electronic document in the visually-represented, corresponding approval route.

17. The electronic document system of claim 14, where the application server sends a message to each approver when the submitted electronic document is awaiting decision by the approver for a step associated with the approver.

18. The electronic document system of claim 14, where the application server receives via the approver page an approval or denial decision, and stores the decision with the extracted data for the submitted electronic document, and invokes a next step in the approval route.

19. The electronic document system of claim 14, where the application server executes the DCE for the submitted electronic document to parse the electronic document and extract the data from the fields.

20. A method executable by at least one server of an electronic document system, the method comprising:
storing form definitions for a plurality of types of electronic documents in a form definition database, where each form definition comprises a schema including fields of one type of the plurality of types of electronic documents and data types for each field and a unique document identifier identifying the type of electronic document;
storing, in an approval route database, for each of the types of electronic documents, an approval route and the unique document identifier for the type of electronic document, where each approval route includes a plurality of steps and each step includes an identifier of an approver;
storing a data capture entity (DCE) for each type of electronic document, where:
each DCE comprises instructions, which when invoked, perform a function call to extract data from fields in the electronic documents,
the fields to be extracted of a particular type,
the fields to be extracted are determined from at least one form definition and locations of the extracted data,
the determined locations of the extracted data are used to locate the fields from within the electronic documents, and
approval routes are associated with each DCE, such that at least one approval route is modifiable during approval, where each DCE is modifiable based at least in part on an identified approval route being modified,
the at least one approval route including a plurality of paths that are parallel or serial paths and each path comprises steps,
the steps identifying users and approval actions, and
the approval actions to be performed by the users;
creating a form definition for each of a plurality of types of electronic documents;
receiving a submission of an electronic document;
determining a unique document identifier from the submitted electronic document;
identifying a form definition from the form definition database based on the unique document identifier from the submitted electronic document;
executing the DCE associated with the form definition to extract data in fields from the submitted electronic document according to the fields in the identified form definition;
storing the extracted data in a data submission database and associating the stored data with the submitted electronic document;
identifying an approval route from the approval route database based on the unique document identifier from the submitted electronic document, where:
each of the stored approval routes are assigned particular document identifiers, and
the identified approval route specifies a list of users to approve the submitted document and the order of approval traversal amongst the users; and
at each step of the identified approval route, displaying to the approver of the step, via an approver web page generated via the portal, the extracted data for a predetermined set of the fields that are associated with the step to facilitate the approver to approve or deny the submitted electronic document at the step, and the at least one approval route modified during approval and by any modified DCEs.

* * * * *